(12) United States Patent
Taguchi et al.

(10) Patent No.: US 12,503,403 B2
(45) Date of Patent: *Dec. 23, 2025

(54) METHOD OF PRODUCING ALUMINUM HYDROXIDE-COATED SiC PARTICLES, DISPERSION SOLUTION AND MOLDED BODY CONTAINING SAME, AND SINTERED BODY FORMED USING SAME

(71) Applicant: FUJIMI INCORPORATED, Aichi (JP)

(72) Inventors: Souma Taguchi, Aichi (JP); Keigo Kamoshida, Aichi (JP); Tomoaki Nakamura, Aichi (JP); Naoya Miwa, Aichi (JP); Keiji Ashitaka, Aichi (JP)

(73) Assignee: FUJIMI INCORPORATED, Aichi (JP)

( * ) Notice: Subject to any disclaimer, the term of this patent is extended or adjusted under 35 U.S.C. 154(b) by 1156 days.

This patent is subject to a terminal disclaimer.

(21) Appl. No.: 17/415,267

(22) PCT Filed: Dec. 5, 2019

(86) PCT No.: PCT/JP2019/047677
§ 371 (c)(1),
(2) Date: Jun. 17, 2021

(87) PCT Pub. No.: WO2020/158185
PCT Pub. Date: Aug. 6, 2020

(65) Prior Publication Data
US 2022/0055951 A1    Feb. 24, 2022

(30) Foreign Application Priority Data
Jan. 29, 2019  (JP) ................. 2019-013109

(51) Int. Cl.
*C04B 35/565*   (2006.01)
*C04B 35/628*   (2006.01)

(52) U.S. Cl.
CPC ...... *C04B 35/565* (2013.01); *C04B 35/62813* (2013.01); *C04B 2235/3217* (2013.01); *C04B 2235/3826* (2013.01)

(58) Field of Classification Search
CPC ..... C23C 22/05; Y10T 428/2991; C09C 1/28; C09C 1/3054; C09C 3/06; C09C 3/063; C04B 35/565; C04B 35/575; C04B 35/5755; C04B 35/638; C04B 35/64
See application file for complete search history.

(56) References Cited

U.S. PATENT DOCUMENTS

| | | | | |
|---|---|---|---|---|
| 5,098,740 A | * | 3/1992 | Tewari | C04B 35/6455 427/217 |
| 5,165,996 A | * | 11/1992 | Jacobson | C04B 35/62813 428/404 |
| 10,913,857 B2 | * | 2/2021 | Tsubota | C09C 1/28 |
| 2013/0102109 A1 | * | 4/2013 | Stewart | H01L 31/02167 257/E31.124 |
| 2015/0307980 A1 | * | 10/2015 | Espallargas | C23C 4/02 428/404 |
| 2019/0211434 A1 | * | 7/2019 | Espallargas | C23C 18/08 |
| 2020/0216677 A1 | * | 7/2020 | Tsubota | C09C 1/28 |
| 2021/0380813 A1 | * | 12/2021 | Taguchi | C04B 35/6342 |

FOREIGN PATENT DOCUMENTS

| | | |
|---|---|---|
| EP | 3543210 A1 | 9/2019 |
| JP | 62138362 A | 6/1987 |
| JP | 0912373 A | 1/1997 |
| JP | 10237579 A | 9/1998 |
| JP | 2012106888 A | 6/2012 |
| WO | 2018033577 A1 | 2/2018 |

OTHER PUBLICATIONS

Brynestad et al ("Removal of Oxide Contamination from Silicon Carbide Powders", Communications of the American Ceramic Society, Sep. 1984). (Year: 1984).*
Second Office Action for Chinese Patent Application No. 201980090295. 7, with a mailing date of Jan. 19, 2023, 3 sheets.
Communication pursuant to Article 94(3) EPC from European Patent Application No. 19912315.9, with a mailing date of Mar. 13, 2023, 5 sheets.
Notice of Reasons for Refusal for JP Patent Application No. 2019-013109, with a mailing date of Jun. 10, 2022.
First Office Action for CN Patent Application No. 201980090295.7, with a mailing date of Jun. 1, 2022.
Extended European Search Report for EP 19912315.9 with a mailing date of Feb. 9, 2022.
Liu Yiteng et al: "Improved Sintering Ability of SiC Ceramics from SiC@Al2O3 Core-shell Nanoparticles Prepared by a Slow Precipitation Method", Ceramics International, vol. 45, No. 6, Jan. 4, 2019 (Jan. 4, 2019), pp. 8032-8036.

(Continued)

*Primary Examiner* — Hoa (Holly) Le
(74) *Attorney, Agent, or Firm* — Katten Muchin Rosenman LLP

(57) ABSTRACT

The present invention provides means capable of satisfactorily exhibit the properties inherent in the inorganic particle and the constituent material of the coating layer, such as obtaining high dispersibility and high mechanical properties in the coated particle that contains the inorganic particle having at least the inorganic substance capable of forming an inorganic oxide on a surface, and the coating layer with which the inorganic particle is coated. The present invention relates to a coated particle that contains an inorganic particle having at least an inorganic substance capable of forming an inorganic oxide on a surface, and a coating layer with which the inorganic particle is coated, in which the amount of the inorganic oxide per unit surface area of the inorganic particle does not exceed 0.150 mg/m².

10 Claims, No Drawings

(56) References Cited

OTHER PUBLICATIONS

Office Action for CA Patent Application No. 3,121,896, with a mailing date of Sep. 19, 2024.
Office Action for CA Application No. 3,121,896, with a Mailing Date of Aug. 21, 2025.

* cited by examiner

METHOD OF PRODUCING ALUMINUM HYDROXIDE-COATED SiC PARTICLES, DISPERSION SOLUTION AND MOLDED BODY CONTAINING SAME, AND SINTERED BODY FORMED USING SAME

CROSS-REFERENCE TO RELATED APPLICATIONS

This application is a U.S. National Stage entry of International Application No. PCT/JP2019/047677 filed Dec. 5, 2019, which claims the benefit of JP Patent Application No. 2019-013109 filed Jan. 29, 2019, each of which is herein incorporated by reference in its entirety for all purposes.

TECHNICAL FIELD

The present invention relates to a coated particle, a dispersoid and a molded body containing the same, and a sintered body formed by using the same.

BACKGROUND ART

Since an inorganic particle has excellent properties such as hardness, high temperature heat resistance, mechanical strength, impact resistance, wear resistance, oxidation resistance or corrosion resistance, and a small coefficient of thermal expansion depending on the types thereof, it has been expected to be applied in various applications such as polishing compositions and high-temperature structural members.

In the application of the inorganic particle, in forming a desired composition or material, it has been studied to use the inorganic particles dispersed in a medium of a dispersing medium or a polymer material, or to mix and use them with other materials such as ceramic particles. Further, in order to improve functions of, for example, a dispersoid and a mixture containing the inorganic particles, and a molded body formed therefrom, it has been studied to coat the inorganic particle with a material capable of imparting a desired function to obtain a coated particle, and then disperse and mix the coated particles.

JP 2012-106888 A discloses that a surface of SiC powder, which is inorganic particles, is coated with an oxide film of alumina or the like, of which a thickness is 10 nm or more and 500 nm or less, provided by sintering, so that insulation properties can be improved. It is also disclosed that the heat resistance, high thermal conductivity, and high insulation properties of a composite composition can be realized by containing such powder.

SUMMARY OF INVENTION

However, in a technique according to JP 2012-106888 A, there have been problems in that the properties inherent in SiC particles and a coating layer are not exhibited, and, for example, the dispersibility is insufficient and the mechanical strength of a sintered body is insufficient.

Therefore, an object of the present invention to provide means capable of satisfactorily exhibit the properties inherent in an inorganic particle and a constituent material of a coating layer, such as obtaining high dispersibility and an excellent sintered body in a coated particle having the inorganic particle and the coating layer with which the inorganic particle is coated.

In order to solve the above problems, the inventors of the present invention have conducted intensive studies. As a result, the inventors have found that the above problems can be solved by setting the amount of inorganic oxide per unit surface area of the inorganic particle constituting the coated particle to a certain level or less, and have completed the present invention.

That is, the above problems of the present invention are solved by the following means;

A coated particle containing an inorganic particle having at least a surface containing an inorganic substance capable of forming an inorganic oxide on a surface, and a coating layer with which the inorganic particle is coated, wherein an amount of the inorganic oxide per unit surface area of the inorganic particle does not exceed 0.150 mg/m$^2$.

DESCRIPTION OF EMBODIMENTS

Hereinafter, the present invention will be described. However, the present invention is not limited to the following embodiments.

In the present specification, "X to Y" indicating a range means "X or more and Y or less". In the present specification, unless otherwise specified, measurements of operations, physical properties, and the like are performed under the conditions of room temperature (20 to 25° C.)/relative humidity 40 to 50% RH.

<Coated Particle>

An aspect of the present invention relates to a coated particle that contains an inorganic particle having at least an inorganic substance capable of forming an inorganic oxide on a surface, and a coating layer with which the inorganic particle is coated, in which the amount of the inorganic oxide per unit surface area of the inorganic particle does not exceed 0.150 mg/m$^2$. According to the aspect of the present invention, it is possible to provide means capable of satisfactorily exhibit the properties inherent in the inorganic particle and the constituent material of the coating layer, such as obtaining high dispersibility and an excellent sintered body in the coated particle that contains the inorganic particle having at least the inorganic substance capable of forming an inorganic oxide on a surface, and the coating layer with which the inorganic particle is coated.

The present inventors presume the mechanism by which the above-mentioned problems are solved by the present invention as follows.

The inorganic particle having at least an inorganic substance capable of forming an inorganic oxide on a surface is naturally oxidized to form an oxide layer made of an inorganic oxide on the surface thereof. The presence of this oxide layer between the inorganic particle and the coating layer may prevent contact between the inorganic substance that originally constitute the inorganic particle and the constituent material of the coating layer in the coated particle. Further, while the composition of the coating layer and the inorganic particle changes during sintering, when the coated particles come into contact with each other, the contact between the inorganic substance originally constituting the inorganic particle may be hindered. In these cases, the inorganic particle and the constituent materials of the coating layer is not able to exhibit their original properties.

On the other hand, in the coated particle according to one embodiment of the present invention, the amount of inorganic oxide per unit surface area of the inorganic particle is a certain amount or less. This means that the oxide layer formed on the surface of the inorganic particle is thin and the area is small. In this case, the contact between the inorganic substances that originally constitute the inorganic particle and the constituent materials of the coating layer in the coated particle is less likely to be hindered. Further, while the composition of the coating layer and the inorganic particle changes during sintering, when the coated particles come into contact with each other, the contact between the inorganic substances originally constituting the inorganic particle is less likely to be hindered. Therefore, in the coated particle according to the embodiment of the present invention, the inorganic particle and the constituent materials of the coating layer can exhibit their original properties.

The above mechanism is based on speculation, and its correctness does not affect the technical scope of the present invention.

In the present specification, the term "coated particle" refers to a particle in which at least a part of an inorganic particle is coated with a coating layer.

Further, in the present specification, an aggregate of particles containing a plurality of coated particles as a main component is also referred to as "coated particle powder". In the present specification, the term "powder" is used for convenience, but the term does not only refer to powdered (dried) substances, but also refer to a substance that exists in a state of being dispersed in a dispersing medium and can be obtained as a powder when the dispersing medium is volatilized.

A zeta potential at pH 4.5 of the coated particle is an indicator of dispersibility. It means that the dispersibility is further improved as the absolute value of the zeta potential becomes larger. The absolute value of the zeta potential is preferably 20 mV or more, more preferably 30 mV or more, and still more preferably 40 mV or more. Within the above range, the dispersibility is further improved when the coated particles are dispersed in a medium such as a dispersing medium or a resin. The zeta potential at pH 4.5 can be obtained by preparing a zeta potential measuring solution (aqueous dispersion of coated particle powder) having a pH of 4.5 and measuring the zeta potential measuring solution with a zeta potential measuring device (product name "Zetasizer nano ZSP", manufactured by Malvern Instruments). Here, the pH can be measured with a pH meter (model number: F-71) manufactured by HORIBA, Ltd. Details of a method for measuring the zeta potential at pH 4.5 will be described in examples.

The viscosity of the aqueous dispersion of the coated particle is also an indicator of the dispersibility. It means that the dispersibility is further improved as the value of the viscosity becomes smaller. The viscosity is preferably 40 mPa·s or less, more preferably 35 mPa·s or less, and still more preferably 30 mPa·s or less (lower limit of more than 0 mPa·s). Within the above range, the dispersibility is further improved when the coated particles are dispersed in a medium such as a dispersing medium or a resin. The viscosity can be obtained by preparing a viscosity measuring solution (12% by mass of aqueous dispersion of coated particle powder, that is, an aqueous dispersion with 12% by mass of coated particles relative to the total mass of the dispersion) and being measured at an environmental temperature of 25° C. at the time of measurement using a TVB10H type viscometer manufactured by Toki Sangyo Co., Ltd. under the condition that the rotation speed of a H2 rotor is 100 rpm. Details of a method for measuring the viscosity at pH 4.5 will be described in examples.

Here, when the zeta potential is in the above range, the electrostatic secondary aggregation of the coated particles themselves is further suppressed, and when the viscosity is in the above range, the dispersibility of the coated particles as a dispersion in the state of primary particles or secondary particles is further improved. With this, from the viewpoint of improving the dispersibility of the coated particles, it is particularly preferable that the coated particle indicates the range of the zeta potential and the range of the viscosity.

The upper limit of an average secondary particle size of the coated particles is not particularly limited, and is preferably 10 μm or less, more preferably 5 μm or less, still more preferably 2 μm or less, particularly preferably 1 μm or less, and most preferably 0.5 μm or less. Within the above range, the dispersibility is further improved when the coated particles are dispersed in a medium such as a dispersing medium or a resin. In addition, the lower limit of an average secondary particle size of the coated SiC particle powder is not particularly limited, and is preferably 0.03 μm or more, more preferably more than 0.03 μm, and still more preferably 0.05 μm or more, more than 0.05 μm, particularly preferably 0.1 μm or more, and most preferably more than 0.1 μm. Within the above range, the particle size distribution becomes smaller, aggregation in the dispersing medium is less likely to occur, and the dispersibility is further improved. Here, the value of the average secondary particle size of the coated particles can be measured by a scattering particle size distribution measuring device LA-950 manufactured by HORIBA, Ltd., in a dispersoid in which the coated particles (coated particle powder) are dispersed in a dispersing medium so as to have an appropriate measurement concentration.

As will be described later, among the coated particle according to the embodiment of the present invention, a particularly preferable inorganic particle is a silicon carbide particle (a SiC particle), and a particularly preferable coating layer is a coating layer containing aluminum hydroxide. That is, the coated particle according to a particularly preferable embodiment of the present invention is a coated SiC particle having a coating layer containing aluminum hydroxide (hereinafter, also simply referred to as "aluminum hydroxide-coated SiC particle").

Hereinafter, each component constituting the coated particle according to the embodiment of the present invention will be described in detail. However, the present invention is not limited to those described below.

(Inorganic Particle)

The coated particle according to the embodiment of the present invention includes an inorganic particle containing at least an inorganic substance capable of forming an inorganic oxide on a surface (also simply referred to as "inorganic particle" in the present specification).

The inorganic substance capable of forming the inorganic oxide constituting the inorganic particle is not particularly limited, and known substances can be used. Examples thereof include various metals such as nickel (Ni), iron (Fe), copper (Cu), aluminum (Al), tin (Sn), lead (Pb), chromium (Cr), cobalt (Co), silver (Ag), and titanium (Ti), metal alloys, silicon (Si), silicon nitride (SiN), silicon carbide (SiC), silicon carbide (SiCN), boron (B), boron nitride (BN), boron carbide (BC), and boron carbonitride (BCN).

Further, as the inorganic particles, known particles can be used without particular limitation as long as the surface contains at least an inorganic substance capable of forming an inorganic oxide. That is, the inorganic particle may be formed of a single layer or may have different internal and external compositions such as a core-shell structure; however, from the viewpoint of having more excellent properties, it is preferably formed of a single layer.

Accordingly, preferable examples of the inorganic particle include various metal particles such as nickel (Ni), iron (Fe), copper (Cu), aluminum (Al), tin (Sn), lead (Pb), a chromium particle (Cr), cobalt (Co), silver (Ag), and titanium (Ti), alloy particles composed of these combinations, a silicon particle (Si particle), a silicon nitride particle (SiN particle), a silicon carbide particle (SiC particle), a silicon nitride carbide particle (SiCN particle), a boron particle (B particle), a boron nitride particle (BN particle), a boron carbide particle (BC particle), and a boron carbonitride particle (BCN particle). Among these, a Si particle, a SiN particle, a SiC particle, a SiCN particle, a B particle, a BN particle, a BC particle, and a BCN particle are more preferable, and a SiC particle are still more preferable. Since the SiC particle has high hardness, excellent high temperature heat resistance, mechanical strength, impact resistance, wear resistance, oxidation resistance, and corrosion resistance, and has a small coefficient of thermal expansion, it can be used in various applications such as polishing compositions and high-temperature structural members.

Here, when the inorganic particle is the above-mentioned metal or alloy oxide, examples of the inorganic oxide forming the oxide layer include metal oxides of metal elements contained therein. When the inorganic particle is a Si particle, a SiN particle, a SiC particle, or a SiCN particle, examples of the oxide forming the oxide layer include a silicon oxide ($SiO_2$) and the like. When the inorganic particle is a B particle, a BN particle, a BC particle, or a BCN particle, examples of the oxide forming the oxide layer include boron oxide ($B_2O_3$) and the like.

With this, in a preferable embodiment of the present invention, the inorganic particle is a silicon carbide particle (SiC particle), and the inorganic oxide is a silicon oxide ($SiO_2$).

In the coated particle according to the embodiment of the present invention, the amount of inorganic oxide per unit surface area of the inorganic particle does not exceed 0.150 mg/m$^2$. If the amount of the inorganic oxide per unit surface area of the inorganic particle exceeds 0.150 mg/m$^2$, the inorganic particle and the constituent materials of the coating layer is not able to exhibit their original properties, for example, sintering of a sintered body containing the coated particle requires a high temperature, which causes problems such as stricter firing conditions and the inability to obtain an excellent sintered body. With this, from the viewpoint of better exerting the functions of the inorganic particle and the constituent materials of the coating layer, the upper limit of the amount of the inorganic oxide per unit surface area of the inorganic particle is preferably smaller, preferably 0.150 mg/m$^2$ or less, more preferably 0.100 mg/m$^2$ or less, and still more preferably 0.050 mg/m$^2$ or less (lower limit of 0 mg/m$^2$). Here, the amount of the inorganic oxide per unit surface area of the inorganic particle can be measured by a known method depending on the type of the inorganic substance and the inorganic oxide constituting the inorganic particle. For example, when the inorganic oxide is silicon oxide, it can be measured based on a method for quantifying free silicon dioxide in JIS R 1616:2007 using a spectrophotometer (model number: UVmini-1240 manufactured by Shimadzu Corporation.). The details of the measurement method when the inorganic particle is a SiC particle and the inorganic oxide is $SiO_2$ will be described in examples.

The amount of inorganic oxide per unit surface area of the inorganic particle can be controlled by the strength of a treatment and treatment time in an oxide layer removing treatment described later, whether or not the particle is in a state of a dry powder after the oxide layer removing treatment, the leaving time of the dry powder in the atmosphere, or the like.

The upper limit of an average primary particle size of the inorganic particles is not particularly limited, and is preferably less than 10 μm, more preferably less than 5 μm, still more preferably less than 2 μm, particularly preferably less than 1 μm, and most preferably less than 0.5 μm. Within the above range, the oxide layer is more likely to be formed, which makes the present invention more useful. In addition, within the above range, the dispersibility is further improved when the coated particles are dispersed in a medium such as a dispersing medium or a resin. The lower limit of the average primary particle size of the inorganic particles is not particularly limited, and is preferably 0.03 μm or more, more preferably 0.05 μm or more, and still more preferably 0.1 μm or more. Within the above range, the more excellent properties of the coated particle can be exhibited. Here, the value of the average primary particle size of the inorganic particles can be calculated as a volume average particle size of 100 particles by performing photographing with a scanning electron microscope (SEM) SU8000 manufactured by Hitachi High-Tech Corporation, and using image analysis type particle size distribution software MacView manufactured by MOUNTECH Co., Ltd.

The upper limit of an average secondary particle size of the inorganic particles is not particularly limited, and is preferably less than 10 μm, more preferably less than 5 μm, still more preferably less than 2 μm, particularly preferably less than 1 μm, and most preferably less than 0.5 μm. Within the above range, the dispersibility is further improved when the coated particles are dispersed in a medium such as a dispersing medium or a resin. The lower limit of the average secondary particle size of the inorganic particles is not particularly limited, and is preferably 0.03 μm or more, more preferably 0.05 μm or more, and still more preferably 0.1 μm or more. Within the above range, the coating of inorganic particle can be performed more efficiently. The value of the average secondary particle size of the inorganic particles can be measured by the scattering particle size distribution measuring device LA-950 manufactured by HORIBA, Ltd.

As the inorganic particle, a commercially available product may be used as it is, or may be used after undergoing an oxide layer removing treatment described later, or a synthetic product (a manufactured product) may be used.

When the inorganic particle is a commercially available product, for example, GC#40000, GC#8000S, or the like manufactured by Fujimi Inc. can be used as the SiC particle after the oxide layer removing treatment described later.

When the inorganic particle is a synthetic product (a manufactured product), the inorganic particle is preferably produced in a dispersing medium by a method that does not go through the dried particle. Further, as the dispersing medium, those used in the preparation of a raw material dispersion (1) in a step (A) according to a coating method 1 of a coating layer forming step described later can be used alone or in combination of two or more. Among these, those containing water are preferable, and water (preferably pure water) is more preferable.

The method for producing the inorganic particle that does not go through the dried particle is not particularly limited, and a known method can be used. For example, a method including a pulverizing step of an inorganic coarse powder in the following dispersing medium can be mentioned.

[Pulverizing Step of Inorganic Coarse Powder in Dispersing Medium]

In a pulverizing step of the inorganic coarse powder in the dispersing medium, first, the inorganic particles (in the present specification, also referred to as inorganic coarse powder) having an average primary particle size larger than the target average primary particle size of the inorganic particles are prepared. Next, the inorganic coarse powder and the dispersing medium are charged into a pulverizing device, and pulverized under pulverization conditions capable of collecting the inorganic particles having a target average primary particle size.

Examples of the pulverizing device include a ball mill, a roller mill, a jet mill, a hammer mill, a pin mill, and an attritor. Among these, from the viewpoint of the uniformity of the inorganic particles after pulverization and the improvement of the dispersibility of the particles in the dispersing medium, pulverization is preferably performed by a ball mill. The ball mill is not particularly limited, and for example, a pot mill turntable ANZ-10D manufactured by Tech-Jam Co., Ltd. can be used. In addition, the balls used in the ball mill are not particularly limited, and examples thereof include alumina balls. A diameter of the ball may be appropriately selected according to the average primary particle size and the like of the inorganic coarse powder and the target inorganic particles.

The pulverizing conditions can be determined by confirming in advance the relationship between, for example, in the pulverizing device to be used, the mass ratio of the inorganic coarse powder to be charged and the dispersing medium, the pulverizing time, the number of revolutions, or the like, and the average primary particle size and the particle size distribution of the inorganic particles after pulverization.

The amount of the inorganic coarse powder to be added and the dispersing medium is not particularly limited, and from the viewpoint of uniformity and production efficiency of the inorganic particles after pulverizing, the amount of the inorganic coarse powder charged is preferably 20% by mass or less, more preferably less than 20% by mass, still more preferably 18% by mass or less, and particularly preferably 16% by mass or less with respect to the total mass of the inorganic coarse powder and the dispersing medium (lower limit is more than 0% by mass).

After pulverizing the inorganic coarse powder, if necessary, the dispersoid containing the inorganic particles and the dispersing medium obtained after pulverization is charged into a conical classification facility called a classification tower from the ball mill without interposing a drying step, and only the dispersoid parts containing the inorganic particles of the target particle size part and the dispersing medium may be collected by utilizing the difference in the sedimentation time of the particles. However, if there is no particular need, classification may not be performed.

Then, the collected inorganic particles and the dispersoid containing the dispersing medium are allowed to stand in a beaker, the inorganic particles have completely settled, and then, the dispersing media of a supernatant part are collected so that the concentration of the inorganic particles in the dispersoid becomes a desired concentration. By preparing the dispersion containing the inorganic particles and the dispersing medium in this way, the inorganic particle can be produced without going through the dried particle.

The inorganic particle may be used either singly or in combination of two or more types.

(Coating Layer)

The coated particle according to one embodiment of the present invention contains a coating layer with which the inorganic particle is coated. In the present specification, it is treated that the coating layer does not contain an oxide layer that can be formed by oxidizing the inorganic particle. The coating layer can impart various functions to the coated particle depending on the type of the constituent material thereof.

The constituent material of the coating layer is not particularly limited, and known materials can be used. That is, the coating layer may be an organic substance or an inorganic substance. Among these, from the perspective of having more excellent properties, the coating layer preferably contains an inorganic substance other than the inorganic substance contained at least on the surface of the inorganic particle and the inorganic oxide that can be formed by the oxidation of the inorganic particle (that is, an inorganic substance excluding the inorganic substance contained at least on the surface of the inorganic particle and inorganic oxide that can be formed by oxidation of the inorganic particle).

Further, the inorganic substance that can be contained in the coating layer preferably contains a metal element. The metal element is not particularly limited, and for example, the same metal as the metal mentioned as the inorganic substance constituting the inorganic particle can be used. Among these, the inorganic substance that can be contained in the coating layer more preferably contains an aluminum element. The coating layer containing the aluminum element can give the inorganic particle a function of giving insulating properties, a function as a sintering aid when producing a molded body, and a function of improving polishing properties when used in a polishing composition.

The aluminum element in the coating layer is preferably contained in the form of an aluminum compound. The aluminum compound is not particularly limited, and known compounds can be appropriately adopted, but among these, an aluminum oxide precursor is particularly preferable. That is, in the coating layer according to a preferable embodiment of the present invention, the inorganic substance that can be contained in the coating layer includes the aluminum oxide precursor containing an aluminum element. The aluminum oxide precursor in the coating layer changes to an aluminum oxide when the coated particle is sintered. The aluminum oxide functions as an excellent sintering aid. Then, by using a method for changing the aluminum oxide precursor in the coating layer to the aluminum oxide at the time of sintering the coated particle, it is possible to form a sintered body of the coated particle having more excellent properties.

However, the aluminum oxide is more likely to aggregation than the aluminum oxide precursor. With this, in the coated particles having the coating layer containing aluminum oxide in the state before sintering, the aggregation of the coated particles may be further advanced through the aggregation of the aluminum oxide. Therefore, the coated particle preferably has the coating layer that changes to aluminum oxide by firing, and the coating layer preferably contains substantially no aluminum oxide. In this case, within the above range, the dispersibility is further improved when the coated particles are dispersed in a medium such as a dispersing medium or a resin.

In the specification of the present application, "contains substantially no aluminum oxide" means that the spectral shape peculiar to the EELS standard spectrum of aluminum oxide is not clearly observed in the EELS (Electron Energy Loss Spectroscopy) analysis of the coated particles. Here, the EELS analysis can be performed using TITAN 80-300 manufactured by FEI.

The aluminum compound that can be used as the aluminum oxide precursor is not particularly limited, and examples thereof include aluminum hydroxide; aluminum hydroxide oxide; aluminum salts such as aluminum nitrate, aluminum chloride, aluminum acetate, aluminum sulfate, alum aluminum, aluminum formate, aluminum benzoate, aluminum linoleate, aluminum oleate, aluminum palmitate, aluminum salicylate, and aluminum gallate; aluminum alkoxides such as trimethoxyaluminum, triethoxyaluminum, triisopropoxyaluminum, and tributoxyaluminum; and organoaluminium compounds such as triethylaluminum, triisobutylaluminum, diethylaluminum chloride, ethylaluminum sesquichloride, ethylaluminum dichloride, and tri-n-octylaluminum. These may be used in the form of hydrates. Among these, aluminum hydroxide is preferable from the viewpoint that aggregation of the coated particles is unlikely to occur when the coating layer is formed using the precursor. That is, it is preferable that the coating layer of the coated particle according to a preferable embodiment of the present invention contains an aluminum oxide precursor, and the aluminum oxide precursor contains aluminum hydroxide. The coated particles having the coating layer containing aluminum hydroxide exhibit higher dispersibility when the coated particles are dispersed in a medium such as a dispersing medium or a resin, while having a function derived from an aluminum compound.

Further, the coating layer may contain other components as long as the effects of the present invention are not impaired.

The inclusion of the aluminum element in the coating layer can be confirmed by performing SEM (Scanning Electron Microscope)-EDX (Energy Dispersive X-ray Spectroscopy) observation and EELS (Electron Energy Loss Spectroscopy) analysis of the coated particles. Details of the measuring method at pH 4.5 will be described in examples.

Regarding a film thickness of the coating layer, it may be difficult to measure directly due to changes in the presence of particle due to the coating, and it can be determined from the mass of the constituent material of the coating layer per unit surface area of the inorganic particle. It can also be determined from the mass of a specific element contained in the coating layer per unit surface area of the inorganic particle. In general, from the fact that an isoelectric point of the zeta potential tends to increase as the film thickness of the coating layer increases, the film thickness of the coating layer can be determined from the isoelectric point of the coated particles.

(Method for Producing Coated Particle)

The method for producing the coated particle according to one embodiment of the present invention is not particularly limited, and preferably includes the following preparing step of an inorganic particle and forming step of a coating layer.

[Preparing Step of Inorganic Particle]

As described above, in the coated particle according to the embodiment of the present invention, the amount of inorganic oxide per unit surface area of the inorganic particle does not exceed 0.150 mg/m$^2$. With this, as a method for producing a coated particle according to one aspect of the present invention, for example, a method for preparing an inorganic particle in which the amount of an inorganic oxide per unit surface area does not exceed 0.150 mg/m$^2$, and then coating the inorganic particle in a coating layer forming step described later can be mentioned.

In the inorganic particle having at least an inorganic substance capable of forming an inorganic oxide on a surface, generally, as a result of the formation of an oxide layer by natural oxidation, the amount of inorganic oxide per unit surface area exceeds 0.150 mg/m$^2$. Therefore, when a naturally oxidized inorganic particle is used as a raw material (raw material inorganic particle), an oxide layer removing treatment is required. In addition, in the present specification, the step of performing the oxide layer removing treatment is referred to as "oxide layer removing step".

The oxide layer removing method used in the oxide layer removing step is not particularly limited, and a known method can be used. For example, a known method for dissolving an inorganic oxide can be used. When the oxide layer is a layer containing silicon oxide, examples thereof include a treatment with a solution containing hydrofluoric acid (hydrofluoric acid treatment), a treatment with a alkaline solution (alkaline treatment), a treatment with a heated aqueous solution of $Na_2SO_4$, a treatment with $Na_2SO_3$ aqueous solution, and the like. Among these, a hydrofluoric acid treatment or an alkali treatment is preferable, and an alkali treatment is more preferable.

As a preferable example of the method for removing the silicon oxide layer existing on the surface of the SiC particle, an alkaline treatment method, which is a method for adding sodium hydroxide to an aqueous dispersion of the SiC particle (a dispersion containing water as a dispersing medium, preferably an aqueous dispersion containing only water as a dispersing medium) and allowed to elapse at room temperature for an immersion time of 72 hours or more at a pH of 12.5 or more. By this method, the silicon oxide existing on the surface of the SiC particle is ionized and removed from the surface of the SiC particle. As the alkali, known alkalis may be used, and for example, potassium hydroxide or the like may be used. Here, the lower limit of the pH of the alkaline solution in the alkaline treatment is more preferably 13 or more. Within the above range, the oxide layer can be removed more efficiently. The upper limit of the pH is not particularly limited, and is preferably 15 or less from the viewpoint of safety and economic efficiency. Further, the lower limit of the immersion time in the alkaline treatment is more preferably 120 hours or more. Within the above range, the oxide layer can be removed more reliably. In addition, the upper limit of the immersion time is not particularly limited, and is preferably 168 hours or less. Within the above range, the oxide layer can be removed more efficiently.

Further, as another preferable example of the method for removing the silicon oxide layer existing on the surface of the SiC particle, a method by a hydrogen fluoride treatment and the like can be mentioned.

[Coating Layer Forming Step]

A method for coating an inorganic particle is not particularly limited, and known methods can be used.

Hereinafter, as an example of a method for producing a coated particle, a method in a case where the inorganic particle is a SiC particle and the coating layer contains an aluminum compound or a precursor thereof will be described, but the present invention is not limited thereto.

When the aluminum element in the coating layer is contained in the form of the aluminum compound, it is preferable to employ a method for proceeding the coating in a state of the dispersion containing the SiC particle, the aluminum compound contained in the coating layer or the precursor thereof, and the dispersing medium.

Here, it is preferable to control the pH (pH at the coating stage) of the dispersion containing the SiC particle, the aluminum compound contained in the coating layer or the precursor thereof, and the dispersing medium within a predetermined range and maintain it for a certain period of time. The lower limit of the pH range in the coating stage is not particularly limited, and is preferably more than 7, more preferably 9 or more, and still more preferably 10 or more. Within the above range, it is possible to suppress the occurrence of aggregation of the SiC particles and proceed with coating while maintaining better dispersibility of the SiC particles. The upper limit of the pH range in the coating stage is not particularly limited, and is preferably 12 or less, more preferably 11.5 or less, and still more preferably 11 or less. Within the above range, the generation of unavoidable impurities in the coating treatment is further reduced, and the purity of coated SiC-coated particles to be produced is further increased.

Since this coating method is not related to the oxidation reaction and reduction reaction of SiC particle and the removal reaction of the oxide layer, the amount of silicon oxide per unit surface area of SiC particle (amount of inorganic oxide per unit surface area of inorganic particle) is not changed before and after the coating treatment.

The pH at the coating stage can be controlled with a known pH adjusting agent, and preferably with acid or alkali. The acid is not particularly limited, and examples of thereof include inorganic acids such as nitric acid, sulfuric acid, phosphoric acid, and hydrochloric acid (particularly, inorganic strong acids such as nitric acid, sulfuric acid, and hydrochloric acid), and organic acids such as acetic acid, citric acid, lactic acid, oxalic acid, and phthalic acid.

Among these, from the viewpoint that the target can be achieved with a smaller amount added, and a high-purity product with a low possibility of contamination with other elements can be easily obtained, it is preferably inorganic strong acid, more preferably nitric acid, sulfuric acid, or hydrochloric acid. These acids may be used alone or in combination of two or more types. The alkali is not particularly limited, and examples thereof include ammonia, potassium hydroxide, sodium hydroxide, ammonium bicarbonate, ammonium carbonate, potassium hydrogencarbonate, potassium carbonate, sodium hydrogencarbonate, sodium carbonate, tetramethylammonium hydroxide, tetraethylammonium hydroxide, tetrabutylammonium hydroxide, methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, anhydrous piperazine, piperazine hexahydrate, 1-(2-aminoethyl) piperazine, N-methylpiperazine, guanidine, imidazole, triazole, and the like. Among these, for example, when the precursor of the aluminum compound contained in the coating layer is sodium aluminate, sodium hydroxide is preferable from the viewpoint of less generation of unavoidable impurities in the coating treatment. These alkalis may be used alone or in combination of two or more types.

As described above, the coated particle according to a particularly preferable embodiment of the present invention is an aluminum hydroxide-coated SiC particle. The coating method is not particularly limited, and preferable examples thereof include a method for forming a coated particle having a coating layer containing aluminum hydroxide on the surface of the SiC particle by setting the pH of the dispersion containing the SiC particle, sodium aluminate, and water to 9 or more and 12 or less. Here, the aluminum hydroxide-coated SiC particle may be produced in a state of being dispersed in the dispersing medium, or may be produced through a step of removing the dispersing medium thereafter.

Among such coating methods, for example, the following coating method 1 or coating method 2 is preferable, and the following coating method 1 is particularly preferable.

Coating method 1: A method including a step (A) of preparing a raw material dispersion (1) containing a SiC particle, alkali, and water, and having a pH of 9 or more and 12 or less, and a raw material solution (2) containing sodium aluminate and water, respectively; and a step (B) of adding the raw material solution (2) and acid to the raw material dispersion (1) to maintain the pH in a range of 9 or more and 12 or less and forming a coated particle having a coating layer containing aluminum hydroxide on a surface of the SiC particle.

Coating method 2: A method including a step (C) of preparing a raw material dispersion (3) containing a SiC particle, sodium aluminate, and water; and a step (D) of adding acid to the raw material dispersion prepared in the step (C) and setting the pH in a range of 10 or more and 12 or less, to form a coated particle having a coating layer containing aluminum hydroxide on a surface of the SiC particle.

Hereinafter, the coating method 1, which is a particularly preferable coating method, will be described in detail.

<<Step (A)>>

The coating method 1 includes a step (A) of preparing a raw material dispersion (1) containing a SiC particle, alkali, and water, and having a pH of 9 or more and 12 or less, and a raw material solution (2) containing sodium aluminate and water, respectively.

The method for preparing the raw material dispersion (1) is not particularly limited, and examples thereof include a method for adding alkaline to an aqueous dispersion (a dispersion containing water as a dispersing medium, preferably an aqueous dispersion containing only water as a dispersing medium) of the SiC particles.

In the method for preparing the raw material dispersion (1), the content of SiC particles in the raw material dispersion (1) is not particularly limited, and from the viewpoint of productivity, it is preferably 8% by mass or more, and more preferably 10% by mass or more with respect to the total mass of the raw material dispersion (1). In addition, the content of the SiC particles in the raw material dispersion (1) is not particularly limited, and from the viewpoint of the dispersibility, it is preferably 50% by mass or less, more preferably 40% by mass or less, and still more preferably 30% by mass or less with respect to the total mass of the raw material dispersion (1).

In the method for preparing the raw material dispersion (1), the alkali is not particularly limited, and for example, those listed as pH adjusting agents used for controlling the pH at the coating stage can be used. The amount of alkali used is not particularly limited, and the amount used may be adjusted so that the pH of the raw material dispersion (1) is 9 or more and 12 or less.

The raw material dispersion (1) contains water as a dispersing medium. The water is preferably water containing as little impurities as possible. For example, water having a total content of transition metal ions of 100 ppb or less is preferable. Here, the purity of water can be increased by operations of removal of impurity ions using an ion exchange resin, removal of foreign matters through a filter, distillation, and the like. Specifically, as water, for example, deionized water (ion-exchanged water), pure water, ultra-pure water, distilled water, or the like is preferably used. Here, the content of water in the raw material dispersion (1) is preferably 50% by mass or more, more preferably 60% by mass or more, and still more preferably 70% by mass or more (upper limit of less than 100% by mass) with respect to the total mass of the raw material dispersion (1) from the viewpoint of better coating the SiC particles with aluminum hydroxide. Further, the dispersing medium may contain a solvent other than water, and the solvent other than water is preferably an organic solvent. Examples of the organic solvent to be used include acetone, acetonitrile, ethanol, methanol, isopropanol, glycerin, ethylene glycol, propylene glycol and the like, which are organic solvents that are mixed with water. The organic solvents may be used either singly or in combination of two or more types.

The method for preparing the raw material solution (2) is not particularly limited, and examples thereof include a method for adding sodium aluminate to water. The procedure and method for dispersing sodium aluminate in water and the procedure and method for adding alkali are not particularly limited, and known procedures and methods can be used. The content of sodium aluminate in the raw material solution (2) is not particularly limited, and is preferably 10% by mass or more and 50% by mass or less, and more preferably 20% by mass or more and 40% by mass or less, with respect to the total mass of the raw material solution (2).

<<Step (B)>>

The coating method 1 include a step (B) of adding the raw material solution (2) and acid to the raw material dispersion (1) prepared in the step (A) to maintain the pH in a range of 9 or more and 12 or less and forming a coated particle having a coating layer containing aluminum hydroxide on a surface of the SiC particle. In this step (B), an aluminum hydroxide-coated SiC particle is produced.

The method for adding the raw material solution (2) and the acid to the raw material dispersion (1) is not particularly limited as long as the pH can be maintained at 9 or more and 12 or less (that is, unless the concentration of aluminate ions becomes excessive), and examples thereof include a method for adding the raw material solution (2) and the acid at the same time, and a method for adding the raw material solution (2) and the acid alternately little by little.

The amount of the raw material solution (2) added is not particularly limited, and the amount of sodium aluminate added is preferably 7 parts by mass or more, more preferably 20 parts by mass or more, and still more preferably 22 parts by mass or more with respect to 100 parts by mass of the SiC particles in the raw material solution (2). Within the above range, the SiC particle can be sufficiently coated with aluminum hydroxide ($Al(OH)_3$), and the function derived from aluminum hydroxide is further improved. In addition, the amount of the raw material solution (2) added is not particularly limited, and the content of sodium aluminate is preferably 800 parts by mass or less, more preferably 400 parts by mass or less, still more preferably 100 parts by mass or less, and particularly preferably 50 parts by mass or less, with respect to 100 parts by mass of the SiC particles in the raw material solution (2). Since the effect obtained by the coating becomes constant when the coating progresses to some extent, the economic efficiency and the production efficiency are further improved by setting the amount of the raw material solution (2) added to a predetermined amount or less.

The type of acid is not particularly limited, and known acids can be used. Among these, inorganic acid is preferable, hydrochloric acid, nitric acid, and sulfuric acid are more preferable, and hydrochloric acid is still more preferable. The amount of the acid used is not particularly limited, and the amount used may be adjusted so that the pH of the dispersion obtained by mixing the raw material dispersion (1) and the raw material solution (2) is 9 or more and 12 or less. Here, the acid is preferably added in the form of an aqueous solution, and the concentration of the acid in the aqueous solution is not particularly limited, and is preferably 1% by mass or more, more preferably 1.5% by mass or more, and still more preferably 2% by mass or more. Within the above range, addition amount of the aqueous solution containing acid can be further reduced, and the productivity is further improved. The concentration of the acid in the aqueous solution is not particularly limited, and is preferably 30% by mass or less, more preferably 20% by mass or less, and still more preferably 10% by mass or less. Within the above range, the corrosiveness becomes lower and the equipment load becomes smaller.

A rate (addition rate) at which the raw material solution (2) and the acid are added is not particularly limited, and may be appropriately adjusted so that the pH is in the range of 9 or more and 12 or less and the subsequent pH can be easily maintained.

The maintenance time in a state where the pH is in the range of 9 or more and 12 or less in the step (B) is preferably 1 minute or longer, more preferably 30 minutes or longer, still more preferably 50 minutes or longer, and particularly preferably 60 minutes or longer. Within the above range, the SiC particle can be sufficiently coated with aluminum hydroxide, and the function derived from aluminum hydroxide is further improved. Further, within the above range, the dispersibility is further improved when the coated particles are dispersed in a medium such as a dispersing medium or a resin. In addition, the maintenance time in a state where the pH is in the range of 9 or more and 12 or less in the step (B) is preferably 200 minute or shorter, more preferably 150 minutes or shorter, still more preferably 120 minutes or shorter, and particularly preferably 90 minutes or shorter. Since the effect obtained by the coating becomes constant when the coating progresses to some extent, the economic efficiency and the production efficiency are further improved when the maintenance time is within this range.

The preferable pH range in the step (B) is the same as the pH range of the coating stage described above.

Through the step (B), an aluminum hydroxide-coated SiC particle in the form of a dispersion containing an aluminum hydroxide-coated SiC particle and a dispersing medium are produced. When it is desired to take out the aluminum hydroxide-coated SiC particle from the produced dispersion, the dispersing medium, impurities, and the like can be removed by using known procedures and methods.

After the step (B), it is preferable to add more acids to bring the pH to less than 9. The type of acid is not particularly limited, and known acids can be used. Among these, inorganic acid is preferable, hydrochloric acid, nitric acid, and sulfuric acid are more preferable, and hydrochloric acid is still more preferable. Moreover, it is preferable to use the same type of acid as the acid used when maintaining the pH at 9 or more and 12 or less.

<<Other Steps in Coating Layer Forming Step>>

The above-mentioned coating method 1 may further include other steps other than the step (A) and the step (B), and the step (A) and the step (B) may further include steps related to other operations.

In addition, the above-mentioned coating method 2 may further include other steps other than the step (C) and the step (D), and the step (C) and the step (D) may further include steps related to other operations.

Note that, in the above coating method 1, the solution or dispersion used in each step may contain other components as long as the effects of the present invention are not impaired.

[Other Steps]

The method for producing the coated particle according to the embodiment of the present invention may further include other steps in addition to the preparing step of an inorganic particle and the coating layer forming step described above.

[Producing Method According to a Preferable Embodiment]

Examples of the method for producing a coated particle according to a preferable embodiment of the present invention include a method including an oxide layer removing step of subjecting a SiC particle to an oxide layer removing treatment to obtain a SiC particle in which an amount of $SiO_2$ per unit surface area does not exceed 0.150 mg/m$^2$; and a coating layer forming step of forming a coated particle having a coating layer containing aluminum hydroxide on a surface of the SiC particle with a pH of a dispersion containing the SiC particle after the oxide layer removing treatment, sodium aluminate, and water in the range of 9 or more and 12 or less. That is, it can be said that the method is a method for producing a coated SiC particle, the method including an oxide layer removing step of subjecting a SiC particle to an oxide layer removing treatment to obtain a SiC particle subjected to the oxide layer removing treatment, in which an amount of $SiO_2$ per unit surface area does not exceed 0.150 mg/m$^2$; and a coating layer forming step of forming a coated particle having a coating layer containing aluminum hydroxide on a surface of the SiC particle subjected to the oxide layer removing treatment with a pH of a dispersion containing the SiC particle subjected to the oxide layer removing treatment, sodium aluminate, and water in a range of 9 or more and 12 or less, wherein the coated SiC particle contains the SiC particle after removing the oxide layer and a coating layer with which the SiC particle after removing the oxide layer is coated, the coating layer contains aluminum hydroxide, and an amount of $SiO_2$ per unit surface area of the SiC particle after removing the oxide layer does not exceed 0.150 mg/m$^2$.

According to the method for producing the coated particle according to the preferable embodiment, it is possible to produce a coated particle that has higher dispersibility and can obtain a sintered body exhibiting excellent properties under easier conditions such as lower sintering temperature. Here, the preferable embodiments of the oxide layer removing step and the coating layer forming step are as described above.

Note that, the SiC particle to be subjected to the oxide layer removing treatment may have an amount of $SiO_2$ per unit surface area exceeding 0.150 mg/m$^2$ or 0.150 mg/m$^2$ or less. The reason for this is that when the amount of $SiO_2$ per unit surface area is 0.150 mg/m$^2$ or less, the amount of $SiO_2$ can be further reduced.

Further, in the method for producing the coated particle, the inorganic particle as a raw material and the coated particle to be produced are preferably present in a dispersing medium without being made into a dry powder state even once, from the start of the oxide layer removing treatment to the completion of the coating layer forming treatment.

That is, as a method for producing the coated particle according to a more preferable embodiment of the present invention, in the producing method according to the preferable embodiment, a method for maintaining a state in which the SiC particle and the coated particle are dispersed in a dispersing medium from the start of the oxide layer removal of the SiC particle in the oxide layer removing treatment until the coated particle is formed in the coating layer forming step is exemplified. It can be said that the corresponding method is a method for maintaining a state in which the SiC particle, the SiC particle after removing the oxide layer, and the coated SiC particle are dispersed in a dispersing medium from the start of the oxide layer removal of the SiC particle in the oxide layer removing treatment until the coated SiC particle is formed in the coating layer forming step. According to this method, an increase in the amount of the inorganic oxide per unit surface area of the inorganic particle due to natural oxidation can be suppressed, and it is possible to produce a coated particle that has higher dispersibility, and that can obtain a sintered body exhibiting excellent properties under easier conditions such as lower sintering temperature.

Then, in the above-mentioned production method, before the oxide layer removing step, it is more preferable to further include a pulverizing step of the inorganic coarse powder in the dispersing medium, in which the inorganic particle is produced in the dispersing medium by a method that does not go through the dried particle.

That is, examples of a method for producing the coated particle according to a more preferable embodiment of the present invention include a method further including a pulverizing step of inorganic coarse powder in a dispersing medium, pulverizing a SiC coarse powder in a dispersing medium to produce a SiC particle in which the amount of $SiO_2$ per unit surface area exceeds 0.150 mg/m$^2$ before the oxide layer removing step in the producing method according to the preferable embodiment, wherein a state in which the SiC powder, the SiC particle, and the coated particle are dispersed in the dispersing medium from the start of producing the SiC particle in the pulverizing step of the inorganic coarse powder in the dispersing medium until the coated particle is formed in the coating layer forming step is maintained. According to this method, it is possible to produce a coated particle that has higher dispersibility and can obtain a sintered body exhibiting excellent properties under easier conditions such as lower sintering temperature.

Further, after the oxide layer removing step and before the coating layer forming step, a pulverizing step of the inorganic coarse powder in the dispersing medium, in which the inorganic particle is produced in the dispersing medium using the inorganic particle (inorganic coarse powder) after removing the oxide layer by a method that does not go through dried particle may be further included.

That is, examples of a method for producing the coated particle according to another more preferable embodiment of the present invention include a method further including a pulverizing step of inorganic coarse powder in a dispersing medium, pulverizing a SiC particle (SiC coarse powder after removing the oxide layer) having an amount of $SiO_2$ per unit surface area of 0.150 mg/m$^2$ or less in the dispersing medium to produce a SiC particle in which the amount of $SiO_2$ per unit surface area of 0.150 mg/m$^2$ or less, after the oxide layer removing step and before the coating layer forming step, in the producing method according to the preferable embodiment, wherein a state in which the SiC powder, the SiC particle, and the coated particle are dispersed in the dispersing medium from the start of removing the oxide layer of the SiC particle (SiC coarse powder) in the oxide layer removing treatment until the coated particle is formed in the coating layer forming step is maintained. According to this method, it is possible to produce a coated particle that has higher dispersibility and can obtain a sintered body exhibiting excellent properties under easier conditions such as lower sintering temperature.

Here, in the above method for producing the coated particle, the pH can be measured with a pH meter (model number: F-71) manufactured by HORIBA, Ltd.

<Dispersion>

Another aspect of the present invention relates to a dispersion containing the above-mentioned coated particle and a dispersing medium. The dispersion can be preferably used as a raw material dispersion for a non-sintered molded body and a sintered body having excellent properties, for example. Further, it can be preferably used as a polishing composition having high polishing properties. However, the application of the dispersion is not limited thereto.

(Dispersing Medium)

The dispersion according to the embodiment of the present invention contains a dispersing medium. The dispersing medium preferably contains water, and more preferably water alone. The water is preferably water containing as little impurities as possible. For example, water having a total content of transition metal ions of 100 ppb or less is preferable. Here, the purity of water can be increased by operations of removal of impurity ions using an ion exchange resin, removal of foreign matters through a filter, distillation, and the like. Specifically, as water, for example, deionized water (ion-exchanged water), pure water, ultrapure water, distilled water, or the like is preferably used. Further, the dispersing medium may contain a solvent other than water, and the solvent other than water is preferably an organic solvent. Examples of the organic medium to be used include acetone, acetonitrile, ethanol, methanol, isopropanol, glycerin, ethylene glycol, propylene glycol and the like, which are organic media that are mixed with water. The dispersing medium may be a mixed solvent of water and an organic solvent. The organic solvents may be used either singly or in combination of two or more types.

(Other Components)

The dispersion according to the embodiment of the present invention may contain other components as long as the effects of the present invention are not impaired. Other components are not particularly limited, and are particularly preferably resins, other particles, or pH adjusting agents. A resin is not particularly limited, and known resins can be used. Other particles are not particularly limited, and known organic particles or inorganic particles can be used. Further, the pH adjusting agent is not particularly limited, and a known pH adjusting agent capable of achieving a desired pH can be appropriately used. As the pH adjusting agent, for example, those listed as the pH adjusting agent used for controlling the pH at the coating stage in the description of the coating layer forming step in the above-mentioned method for producing a coated particle can be used.

(Method for Producing Dispersion)

In the method for producing a coated particle, when a dispersion containing the coated particle and the dispersing medium is obtained as a result of the coating treatment, the method may be used as it is as the method for producing a dispersion according to the embodiment of the present invention. Further, the target dispersion may be produced by substituting the dispersing medium of the dispersion obtained as a result of the coating treatment by the method with another dispersing medium. For example, the coated particle may be dispersed in a desired dispersing medium after removing the dispersing medium, impurities, and the like from the produced dispersion by using known procedure and method to take out the coated particle. The procedure and method for dispersing the coated particle in the dispersing medium are not particularly limited, and known procedures and methods can be used. If necessary, other components may be added to the dispersions produced by these methods to produce a desired dispersion.

<Molded Body>

Another aspect of the present invention relates to a molded body including a composition containing the above-mentioned coated particle. The above-mentioned coated particle can form a molded body having excellent properties. In addition, the molded body can be preferably used as a raw material for a sintered body having excellent properties. In addition, in the present specification, a "molded body" may have any shape which can have a certain form, and for example, the molded body also contains a dispersoid obtained by dispersing the coated particle in a resin.

Other materials contained in the composition are not particularly limited, and known materials can be used. For example, known matrix materials and the like can be mentioned. Here, the known matrix material is not particularly limited, and examples thereof include resins such as known thermoplastic resins and known thermosetting resins.

The method for producing the molded body is not particularly limited, and known methods can be used. For example, examples thereof include a method for applying a dispersion containing the above-mentioned coated particle, a resin, and a dispersing medium, a method for cooling a melt of a resin composition obtained by mixing the above-mentioned coated particle and a thermoplastic resin and melting them at a sintering temperature or lower, and a method for mixing and heating the above-mentioned coated particle with a thermosetting resin (resin precursor) to proceed with the polymerization/curing reaction of the thermosetting resin.

<Sintered Body>

Still another aspect of the present invention relates to a sintered body of the above-mentioned coated particle or the above-mentioned molded body. In the above-mentioned coated particle, the composition of the coating layer and the inorganic particle changes during sintering, and when the coated particles come into contact with each other, the contact between the inorganic substances originally constituting the inorganic particles is less likely to be hindered. As a result, the grain growth of the inorganic particles is promoted, the crystal grain particle size can be made larger, the grain boundary can be made smaller, and a sintered body exhibiting excellent properties under easier conditions such as a lower sintering temperature can be formed.

Since it is preferable that the grain growth of the inorganic particles of the coated particles is not suppressed during sintering, the sintered body preferably has a larger crystal particle size in cross section. Such a sintered body can exhibit more excellent properties.

Here, the cross section of the sintered body can be observed by cutting and lap-polishing the sintered body, then immersing the sintered body in a Murakami reagent (KOH: $K_3Fe(CN)_6$:$H_2O$=1:1:2 (mass ratio)) that has been boiled for a predetermined time, etching it, and performing photographing with a scanning electron microscope (SEM) SU8000 manufactured by Hitachi High-Tech Corporation. An average crystal particle size (μm) of the cross section of the sintered body can be obtained by calculating the volume average particle size of 100 particles for the photographed image using image analysis type particle size distribution software MacView manufactured by MOUNTECH Co., Ltd.

In addition, in the sintered body, when the value of the average primary particle size of the inorganic particles used as the raw materials of the coated particles used in the production of the sintered body is set as the average primary particle size (μm) before sintering, a particle growth rate by sintering to be calculated according to the following equation is preferably 250% or more, more preferably 400% or more, and still more preferably 500% or more. Within the above range, it can be said that the crystal particle size in the cross section is sufficiently large.

Particle growth rate (%) by sintering=(average crystal particle size (μm)/average primary particle size (μm) before sintering)×100  [Equation 1]

The method for producing the sintered body is not particularly limited, and known methods can be used. For example, the sintered body can be produced by drying the dispersion of the coated particles for a predetermined time and then pulverizing and sieving in an agate mortar to obtain dry powder of the particles, then filling a carbon baking tool with a predetermined amount of the dry powder, and then sintering with a vacuum hot press machine (manufactured by Fujidempa Kogyo Co., Ltd.). Further, as the sintering conditions, known conditions can be employed, and can be appropriately adjusted depending on the type of the above-mentioned coated particle (coating layer and inorganic particle) and other materials contained in the molded body.

Here, as an example of the sintering conditions when the inorganic particle is SiC particle and the coating layer contains aluminum hydroxide (Al(OH)$_3$), the sintering temperature is 1400° C. or higher. Moreover, the sintering time may be 1 hour or longer. The atmosphere at the time of sintering may be an argon atmosphere. In addition, the pressurization condition includes pressurization of 5 MPa or more by uniaxial pressurization. However, even in this case, the sintering conditions are not limited to these.

EXAMPLES

The present invention will be further described in detail using the following examples and comparative examples. Here, the technical scope of the present invention is not limited to the following examples. In addition, unless otherwise specified, "%" and "parts" mean "% by mass" and "parts by mass", respectively.

Hereinafter, pH indicates a value measured with a pH meter (model number: F-71) manufactured by HORIBA, Ltd.

<Production of Coated Particles>
(Preparation of SiC Particles)
[SiC Particles A]

SiC coarse powder having an average primary particle size of 0.7 μm and pure water were charged into a ball mill so that the amount of the SiC coarse powder charged was 18% by mass with respect to the total mass of the SiC coarse powder and water, and pulverization was performed under pulverization conditions capable of collecting SiC particles having the desired average primary particle size. Then, without interposing a drying step, the aqueous dispersion of pulverized SiC particles was charged from the ball mill into a conical classification facility called a classification tower, and by using the difference in the sedimentation time of the particles, only an aqueous dispersion part of the SiC particles (average primary particle size of 0.30 μm) of a target particle size part was collected. Then, the aqueous dispersion of the collected SiC particles was allowed to stand in a beaker, and after the SiC particles were completely settled, the water in the supernatant was collected so that the concentration of the SiC particles in the aqueous dispersion was 20% by mass, so that an aqueous dispersion 1 (before alkali treatment) having 20% by mass of the SiC particles was prepared.

Next, a 12.5% by mass NaOH aqueous solution (an aqueous solution having a NaOH content of 12.5% by mass based on the total mass of the solution) was added to the obtained aqueous dispersion 1 so as to have a pH of 12.5 or more. Then, the obtained dispersion was stirred at 25° C. for 72 hours to perform an oxide layer removing treatment. Then, the dispersion after the alkali treatment was washed with water in a module until the conductivity becomes 1000 μS/cm or less, so that an aqueous dispersion 2 (after alkali treatment) having 20% by mass of SiC particles A, which are the SiC particles after the oxide layer removing treatment, was prepared.

Here, the value of the average primary particle size of the SiC particles is a value calculated as a volume average particle size of 100 particles by performing photographing with a scanning electron microscope (SEM) SU8000 manufactured by Hitachi High-Tech Corporation, and using image analysis type particle size distribution software MacView manufactured by MOUNTECH Co., Ltd.

[SiC Particles B]

Similar to the preparation of SiC particles A above, after obtaining the aqueous dispersion 2 (after alkali treatment) having 20% by mass of the SiC particles, a drying treatment was carried out by heating in the air at 215° C. for 34 hours to remove water as a dispersing medium to obtain SiC particles B.

[SiC Particles C]

Similar to the preparation of SiC particles A above, after obtaining the aqueous dispersion 1 (before alkali treatment) having 20% by mass of the SiC particles, a drying treatment was carried out by heating in the air at 215° C. for 34 hours to remove water as a dispersing medium to obtain SiC particles C.

In the preparation of the SiC particles, the average primary particle size of the SiC particles when charged into the conical classification facility and collected and the average primary particle size of the SiC particles after the oxide layer removing treatment or the oxide layer removing treatment and the drying treatment were the same as each other.

(Measurement of Amount of SiO$_2$ Per Unit Surface Area of SiC Particles)

Regarding the obtained aqueous dispersion 2 having 20% by mass of the SiC particles A, and the SiC particles B and the SiC particles C were dried in a constant temperature bath at 105° C. for 12 hours as a pretreatment to obtain the SiC particles respectively. After that, the SiC particles were crushed in a mortar, about 0.2 g of the SiC particles were put in a cell (Wa'(g)) whose weight was measured in advance to measure the weight (Wb'(g)), and then the temperature was kept for 5 minutes or longer at 180° C. in a heating portion of a specific surface area measuring instrument (FlowSorb II, manufactured by Shimadzu Corporation). After that, the SiC particles were attached to a measuring unit and an adsorption area (A [m$^2$]) at the time of degassing was measured. Using the A value, the specific surface area SA [m$^2$/g] was calculated by the following equation. A BET specific surface area of each kind of the SiC particles was 32.3 m$^2$/g.

$$SA=A/(Wb'-Wa') \quad \text{[Equation 2]}$$

In the above equation, SA represents the BET specific surface area (m$^2$/g) of the SiC particles;

A represents an adsorption area (m$^2$) at the time of degassing;

Wa' represents a weight of a cell (g); and

Wb' represents a total weight (g) of a sample (SiC particles) and the cell.

Separately, the obtained aqueous dispersion 2 having 20% by mass of the SiC particles A, and an aqueous dispersion having 20% by mass of the SiC particles B in which the obtained SiC particles B are dispersed in water, and an aqueous dispersion having 20% by mass of the SiC particles C in which the obtained SiC particles C are dispersed in water were prepared. Subsequently, in the method for quantifying free silicon dioxide in JIS R 1616: 2007, regarding parts except for the part in which a step of drying the aqueous dispersion having 20% by mass of each kind of the SiC particles (each kind of the SiC particles) at 135 ±5° C. for 2 hours was not performed, the amount of $SiO_2$ per unit surface area of each kind of the SiC particles was measured based on the quantification method using a spectrophotometer (model number: UVmini-1240 manufactured by Shimadzu Corporation.). These results are indicated in Table 1.

TABLE 1

Amount of $SiO_2$ per unit surface area of each SiC particles

| | Oxide layer removing treatment | Dry treatment | Amount of $SiO_2$ per unit surface area of SiC particles (mg/m$^2$) |
|---|---|---|---|
| SiC particles A | Performed | Not performed | 0.031 |
| SiC particles B | Performed | Performed | 0.259 |
| SiC particles C | Not performed | Performed | 0.742 |

Note that, in the measurement using the spectrophotometer described above, as the aqueous dispersion having 20% by mass of the SiC particles B and the aqueous dispersion having 20% by mass of the SiC particles C, the aqueous dispersions within 7 days after the production of the SiC particles B and the SiC particles C were used.

The above measurement was performed within 120 days after the preparation of the aqueous dispersion 2 having 20% by mass of the SiC particles A, and after the preparation of the aqueous dispersion having 20% by mass of the SiC particles B and the aqueous dispersion having 20% by mass of the SiC particles C. However, since the natural oxidation of the SiC particles is generally suppressed in a state of the aqueous dispersion, it is considered that the same result can be obtained even if the operation is carried out in 6 months after the preparation, for example.

(Formation of Coating Layer)

[Coated Particles 1]

A 1 M NaOH aqueous solution was added to the aqueous dispersion 2 having 20% by mass of the obtained SiC particles A so as to have a pH of 10.0. Moreover, an aqueous dispersion having 30% by mass of sodium aluminate was prepared. Next, with respect to the obtained aqueous dispersion of SiC particles A having a pH of 10.0, the obtained aqueous dispersion having 30% by mass of sodium aluminate in an amount of 25 parts by mass of sodium aluminate with respect to 100 parts by mass of SiC particles A and 9.9% by mass of hydrochloric acid aqueous solution were added over 45 minutes with stirring so that a pH was kept in the range of 9.0 or more and 12.0 or less. Subsequently, after stirring the obtained dispersion for another 45 minutes, 9.9% by mass of the hydrochloric acid aqueous solution was added so as to have a pH of 10.5, and then 9.9% by mass of hydrochloric acid was further added so as to have a pH of 3.0, so that a dispersion containing coated particles 1 was prepared.

In the coated 1, from the start of preparation of the SiC particles A to the preparation of the dispersion containing the coated 1, the raw material SiC coarse powder, the SiC particles A, and the coated particles 1 formed therefrom were present in a dispersing medium without being made into a dry powder state even once.

[Coated Particles 2]

The obtained SiC particles B were added to water as a dispersing medium to prepare the aqueous dispersion having 20% by mass of the SiC particles B, and then a 1 M NaOH aqueous solution was added so as to have a pH of 10.0 with respect to the dispersion. Moreover, an aqueous dispersion having 30% by mass of sodium aluminate was prepared. Next, with respect to the obtained aqueous dispersion of SiC particles B having a pH of 10.0, the obtained aqueous dispersion having 30% by mass of sodium aluminate in an amount of 25 parts by mass of sodium aluminate with respect to 100 parts by mass of SiC particles B and 9.9% by mass of hydrochloric acid aqueous solution were added over 45 minutes with stirring so that a pH was kept in the range of 9.0 or more and 12.0 or less. Subsequently, after stirring the obtained dispersion for another 45 minutes, 9.9% by mass of the hydrochloric acid aqueous solution was added so as to have a pH of 10.5, and then 9.9% by mass of hydrochloric acid was further added so as to have a pH of 3.0, so that a dispersion containing a coated particles 2 was prepared.

Note that, in the measurement described above, as the aqueous dispersion having 20% by mass of the SiC particles B, the aqueous dispersion within 7 days after the production of the SiC particles B was used.

<Evaluation of Coated Particles>

(Composition and Structure Analysis of Coated Particles)

Approximately 2 mL each of the obtained dispersion containing the coated particles 1 and the dispersion containing the coated particles 2 was collected and dropped onto a filter (NUCLEPORE 5 μm) (manufactured by WHATMAN). Subsequently, suction filtration was performed, and then each coated particles were washed on a filter with 10 mL of pure water and dried to obtain a dry powder (dried coated particle powder) of each coated particles. Then, these dry powders were collected on a Si wafer to perform SEM (Scanning Electron Microscope)-EDX (Energy Dispersive X-ray Spectroscopy) observation using a scanning electron microscope (SEM) SU8000 manufactured by Hitachi High-Tech Corporation.

In addition, the obtained dry powders were collected on a carbon tape, and analyzed by EELS (Electron Energy Loss Spectroscopy) using TITAN 80-300 manufactured by FEI.

Here, in the SEM-EDX observation of each dry powder, when C, Al, and O were selected as elements to be observed, it was found that the EDX spectrum of Al is observed, and the position where the EDX spectrum of C, Al, and O is observed and the position where the particles are observed in the SEM observation image clearly correspond to each other. From this, it was determined that each coated particles had a structure in which the SiC particles were coated with a component containing Al and O.

In addition, in the EELS analysis of each dry powder, it was confirmed that the observed EELS spectrum had a spectrum shape peculiar to the EELS standard spectrum of aluminum hydroxide ($Al(OH)_3$) (shape different from the spectrum of Al and other compounds containing Al and O), in the coating layer of each coated particles, it was determined that the components containing Al and O included those existing in the state of $Al(OH)_3$.

From the above, it was determined that the coated particles 1 and 2 are both coated particles containing SiC particles and a coating layer with which the SiC particles are coated, and that the coating layer contains $Al(OH)_3$.

(Zeta Potential Measurement)

The aqueous dispersion 2 having 20% by mass of SiC particles A obtained in the above preparation of SiC particles, and the dispersion containing the coated particles 1 and the dispersion containing the coated particles 2 obtained in the production of the coated particles were diluted with pure water, and by using an aqueous solution of NaOH and HCl of 0.01 M or more and 0.1 M or less as a pH adjusting agent, each zeta potential measuring solution (aqueous dispersion of each kind of particle powders) having a pH of 4.5 was prepared.

The zeta potential was measured with a zeta potential measuring device (trade name "Zetasizer nano ZSP") manufactured by Malvern Instruments. Here, the zeta potential was measured using a refractive index of 1.760 and an absorption rate of 0.300, which are typical values of general alumina, as measurement particle conditions. The obtained measurement results were evaluated according to the following criteria. The larger the absolute value of the zeta potential, the better the dispersibility. Here, when the inorganic particles are SiC particles and the coating layer contains aluminum hydroxide (Al(OH)$_3$), ⊙ and ○ indicate good results. These results are indicated in Table 2.

[Evaluation Criteria]
- ⊙: Absolute value of zeta potential is 30 mV or more;
- ○: Absolute value of zeta potential is 20 mV or more and less than 30 mV;
- Δ: Absolute value of zeta potential is less than 20 mV.

(Measurement of Viscosity)

The aqueous dispersion 2 having 20% by mass of SiC particles A obtained in the above preparation of SiC particles, and the dispersion containing the coated particles 1 and the dispersion containing the coated particles 2 obtained in the production of the coated particles were diluted with pure water to prepare each viscosity measuring solution which is an aqueous dispersion having 12% by mass of each type of particles.

Subsequently, after lightly hand-stirring the above-prepared aqueous dispersion, the viscosity of the aqueous dispersion was measured with a TVB10H viscometer manufactured by Toki Sangyo Co., Ltd. under the condition that the rotation speed of a H2 rotor is 100 rpm. The environmental temperature at the time of measurement was 25° C. The smaller the viscosity value, the better the dispersibility. Here, when the inorganic particles are SiC particles and the coating layer contains aluminum hydroxide (Al(OH)$_3$), ⊙ and ○ indicate good results. These results are indicated in Table 2.

[Evaluation Criteria]
- ⊙: Viscosity is less than 35 mPa·s;
- ○: Viscosity is 35 mPa·s or more and less than 40 mPa·s;
- Δ: Viscosity is 40 mPa·s or more.

(Grain Growth During Sintering)
[Production of Sintered Body]

The aqueous dispersion 2 having 20% by mass of SiC particles A obtained in the above preparation of SiC particles, and the dispersion containing the coated particles 1 and the dispersion containing the coated particles 2 obtained in the production of the coated particles were prepared.

Subsequently, the dispersion of each type of the particles was dried for a predetermined time, and then pulverized and sieved in an agate mortar to obtain a dry powder of each kind of particles. A carbon baking tool was filled with a predetermined amount of the obtained dry powder, and pressurization was performed 5 MPa or more using a vacuum hot press machine (manufactured by Fuji Denpa Kogyo) by uniaxial pressurization at a sintering temperature of 1400° C. or higher, a sintering time of 1 hour or longer, and an argon atmosphere so as to obtain a SiC sintered body.

[Observation of Fracture Surface of Sintered Body and Particle Growth Rate by Sintering]

The obtained SiC sintered body was cut and lap-polished, then immersed in a Murakami reagent (KOH:K$_3$Fe(CN)$_6$:H$_2$O=1:1:2 (mass ratio)) that has been boiled for a predetermined time, and etched. Subsequently, the fracture surface (cut surface) of the SiC sintered body was observed by performing photographing with a scanning electron microscope (SEM) SU8000 manufactured by Hitachi High-Tech Corporation. In addition, for the photographed image, the value of the average crystal particle size (μm) of the SiC sintered body was obtained by calculating the volume average particle size of 100 particles for the photographed image using image analysis type particle size distribution software MacView manufactured by MOUNTECH Co., Ltd.

Further, the aqueous dispersion having 20% by mass of SiC particles A obtained in the preparation of the SiC particles and the aqueous dispersion having 20% by mass of the SiC particles B prepared at the time of forming the coating layer of the coated particles 2 were prepared. Here, the value of the average primary particle size (μm) of the sintered body before sintering was obtained by calculating a volume average particle size of 100 particles by performing photographing with a scanning electron microscope (SEM) SU8000 manufactured by Hitachi High-Tech Corporation, and using image analysis type particle size distribution software MacView manufactured by MOUNTECH Co., Ltd.

Here, the value of the volume average particle size of the SiC particles A, which are the raw materials of the coated particles 1, was the value of the average primary particle size before sintering in the SiC sintered body formed by using the coated particles 1. In addition, the value of the volume average particle size of the SiC particles B, which are the raw materials of the coated particles 2, was the value of the average primary particle size before sintering in the SiC sintered body formed by using the coated particles 2.

Then, the particle growth rate (%) by sintering the SiC sintered body was calculated according to the following equation.

$$\text{Particle growth rate (\%) by sintering} = (\text{average crystal particle size (μm)}/\text{average primary particle size (μm) before sintering}) \times 100 \quad \text{[Equation 3]}$$

The particle growth rate (%) by sintering for each SiC sintered body is indicated in Table 2 below. Here, when the particle growth rate by the sintering is 250% or more, it is determined that the crystal particle size is large.

TABLE 2

Evaluation result of particles before being coated used in production of coated particles 1 and each coated particles

| | Amount of $SiO_2$ per unit surface area of SiC particles (mg/m$^2$) | Zeta potential at pH 4.5 | Viscosity | Particle growth rate by sintering (%) | Remarks |
|---|---|---|---|---|---|
| SiC particles A | 0.031 | Δ (+12.2 mV) | Δ (46.5 mPa·s) | Not performed | Reference example (particles before being coated used in production of coated particles 1) |
| Coated particles 1 | 0.031 | ☉ (+45.9 mV) | ☉ (16.6 mPa·s) | 528.7 (Large particle growth during sintering) | Present invention |
| Coated particles 2 | 0.259 | ☉ (+41.3 mV) | ☉ (29.1 mPa·s) | 199.6 (Small particle growth during sintering) | Comparative example |

Note that, as described above, the SiC particles A, and the coated particles 1 formed therefrom were present in a dispersing medium without being made into a dry powder state even once. Further, it is generally considered that the amount of $SiO_2$ per unit surface area of the SiC particles A does not change while existing in the dispersing medium, and the coating reaction does not cause oxidation of the SiC particles. From these facts, it is estimated that the amount of $SiO_2$ per unit surface area of SiC particles A does not change before and after coating.

From the results in Table 1 above, it was found that in order to obtain the coated particle with a small amount of inorganic oxide per unit surface area of the inorganic particle, it is preferable that after the oxide layer removing treatment, the inorganic particle in the dispersion liquid are not dried into a dry powder state in the process of producing the inorganic particle.

In addition, from the results in Table 2 above, it was found that the coated particle with a small amount of inorganic oxide per unit surface area of inorganic particle promotes the grain growth during sintering, have a large crystal particle size, and have excellent dispersibility. The sintered body with large grain growth is considered to have higher strength. On the other hand, it was found that the coated particle having a large amount of inorganic oxide per unit surface area of the inorganic particle suppresses the grain growth during sintering and the crystal particle size becomes smaller.

INDUSTRIAL APPLICABILITY

The coated particle according to the embodiment of the present invention have been expected to be used in various fields in which inorganic particles can be used. For example, it has been expected to be used in various fields such as a polishing field, an electronic device field, and a high temperature structural member field. Among these, applications as insulating members, sintering aids in the production of cemented carbide ceramics, and polishing compositions have been particularly expected. However, the field of application of the coated particle according to the embodiment of the present invention is not limited to these.

This application is based on Japanese Patent Application No. 2019-013109 filed on Jan. 29, 2019, the disclosure of which is incorporated in its entirety by reference.

The invention claimed is:

1. A method for producing a coated SiC particle, comprising:
   an oxide layer removing step of subjecting a SiC particle to an oxide layer removing treatment to obtain a SiC particle subjected to the oxide layer removing treatment, in which an amount of $SiO_2$ per unit surface area does not exceed 0.150 mg/m$^2$; and
   a coating layer forming step of forming a coated particle having a coating layer containing aluminum hydroxide on a surface of the SiC particle subjected to the oxide layer removing treatment with a pH of a dispersion containing the SiC particle subjected to the oxide layer removing treatment, sodium aluminate, and water in a range of 9 or more and 12 or less,
   wherein the coated SiC particle contains the SiC particle subjected to the oxide layer removing treatment and a coating layer with which the SiC particle subjected to the oxide layer removing treatment is coated,
   the coating layer contains aluminum hydroxide, and
   an amount of $SiO_2$ per unit surface area of the SiC particle subjected to the oxide layer removing treatment does not exceed 0.150 mg/m$^2$.

2. The method for producing a coated SiC particle according to claim 1, further comprising:
   maintaining a state in which the SiC particle, the SiC particle subjected to the oxide layer removing treatment, and the coated SiC particle are dispersed in a dispersing medium from the start of the oxide layer removal of the SiC particle in the oxide layer removing treatment until the coated SiC particle is formed in the coating layer forming step.

3. The method for producing a coated SiC particle according to claim 1, wherein a coating method in the coating layer forming step is a coating method 1 or a coating method 2:

a coating method 1 is a method including a step (A) of preparing a raw material dispersion (1) containing the SiC particle subjected to the oxide layer removing treatment, alkali, and water, and having a pH of 9 or more and 12 or less, and a raw material solution (2) containing sodium aluminate and water, respectively; and a step (B) of adding the raw material solution (2) and acid to the raw material dispersion (1) to maintain the pH in a range of 9 or more and 12 or less and forming the coated particle having a coating layer containing aluminum hydroxide on a surface of the SiC particle subjected to the oxide layer removing treatment;

a coating method 2 is a method including a step (C) of preparing a raw material dispersion (3) containing the SiC particle subjected to the oxide layer removing treatment, sodium aluminate, and water; and a step (D) of adding acid to the raw material dispersion prepared in the step (C) and setting the pH in a range of 10 or more and 12 or less, to form the coated particle having a coating layer containing aluminum hydroxide on a surface of the SiC particle subjected to the oxide layer removing treatment.

4. The method for producing a coated SiC particle according to claim 3, wherein the coating method in the coating layer forming step is the coating method 1.

5. The method for producing a coated SiC particle according to claim 3, wherein in the coating method 1, the alkali is at least one selected from the group consisting of ammonia, potassium hydroxide, sodium hydroxide, ammonium hydrogen carbonate, ammonium carbonate, potassium hydrogen carbonate, potassium carbonate, sodium hydrogen carbonate, sodium carbonate, tetramethylammonium hydroxide, tetraethylammonium hydroxide, tetrabutylammonium hydroxide, methylamine, dimethylamine, trimethylamine, ethylamine, diethylamine, triethylamine, ethylenediamine, monoethanolamine, N-(β-aminoethyl) ethanolamine, hexamethylenediamine, diethylenetriamine, triethylenetetramine, anhydrous piperazine, piperazine hexahydrate, 1-(2-aminoethyl) piperazine, N-methylpiperazine, guanidine, imidazole, and triazole.

6. The method for producing a coated SiC particle according to claim 4, wherein the alkali is at least one selected from the group consisting of ammonia, potassium hydroxide, sodium hydroxide, ammonium hydrogen carbonate, ammonium carbonate, potassium hydrogen carbonate, potassium carbonate, sodium hydrogen carbonate, sodium carbonate, tetramethylammonium hydroxide, tetraethylammonium hydroxide, tetrabutylammonium hydroxide, methylamine, dimethylamine, trimethylamine, ethylamine, diethylamine, triethylamine, ethylenediamine, monoethanolamine, N-(β-aminoethyl) ethanolamine, hexamethylenediamine, diethylenetriamine, triethylenetetramine, anhydrous piperazine, piperazine hexahydrate, 1-(2-aminoethyl) piperazine, N-methylpiperazine, guanidine, imidazole, and triazole.

7. A method for producing a dispersion comprising a coated particle and a dispersing medium, comprising:
obtaining a dispersion containing the coated SiC particle and a dispersing medium by the method according to claim 1.

8. The method for producing the dispersion according to claim 7, further comprising:
substituting the dispersing medium of the dispersion obtained as a result of the coating layer forming step with another dispersing medium.

9. A method for producing a molded body comprising a composition containing a coated SiC particle, comprising:
producing the coated SiC particle by the method according to claim 1; and
applying a dispersion containing the coated SiC particle, a resin, and a dispersing medium,
cooling a melt of a resin composition obtained by mixing the coated SiC particle and a thermoplastic resin and melting them at a sintering temperature or lower, or
mixing and heating the coated SiC particle with a thermosetting resin to proceed with the polymerization/curing reaction of the thermosetting resin.

10. A method for producing a sintered body, comprising:
producing the coated SiC particle by the method according claim 1, or
producing a molded body by the method according to claim 9; and
sintering the coated SiC particle or the molded body.

* * * * *